United States Patent
Skinner et al.

(10) Patent No.: US 7,197,541 B1
(45) Date of Patent: Mar. 27, 2007

(54) METHOD AND APPARATUS FOR AUTOMATED PERSONALITY TRANSFER FOR A WIRELESS ENABLED HANDHELD DEVICE

(75) Inventors: Craig Stuart Skinner, Snohomish, WA (US); Jeffry Harlow Loucks, Gig Harbor, WA (US)

(73) Assignee: Palm, Inc., Santa Clara, CA (US)

( * ) Notice: Subject to any disclaimer, the term of this patent is extended or adjusted under 35 U.S.C. 154(b) by 547 days.

(21) Appl. No.: 09/884,806

(22) Filed: Jun. 18, 2001

(51) Int. Cl.
*G06F 15/167* (2006.01)
*H04M 1/00* (2006.01)

(52) U.S. Cl. .................... 709/216; 455/556.2
(58) Field of Classification Search ........ 709/216, 709/217, 219, 232; 455/556.1, 556.2, 550.1, 455/412.1
See application file for complete search history.

(56) References Cited

U.S. PATENT DOCUMENTS

| | | | |
|---|---|---|---|
| 5,497,464 A * | 3/1996 | Yeh | 710/303 |
| 5,802,275 A * | 9/1998 | Blonder | 713/200 |
| 5,878,282 A * | 3/1999 | Mital | 710/62 |
| 7,117,374 B2 * | 10/2006 | Hill et al. | 713/193 |
| 2002/0032042 A1 * | 3/2002 | Poplawsky et al. | 455/564 |
| 2002/0065905 A1 * | 5/2002 | Kliland et al. | 709/220 |
| 2002/0078248 A1 * | 6/2002 | Janik et al. | 709/252 |
| 2002/0081995 A1 * | 6/2002 | Leppinen et al. | 455/412 |
| 2002/0083432 A1 * | 6/2002 | Souissi et al. | 717/178 |
| 2002/0104080 A1 * | 8/2002 | Woodard et al. | 717/176 |

* cited by examiner

*Primary Examiner*—David Wiley
*Assistant Examiner*—J. Bret Dennison
(74) *Attorney, Agent, or Firm*—Foley & Lardner LLP

(57) ABSTRACT

A method and system for restoring device personality after failure. Specifically, the present invention discloses a method and system for automated personality transfer in a wireless enabled handheld device. In one embodiment, the present invention automatically extracts personality information that is unique and critical to the proper functionality of an electronic device. A personality file containing the personality information is created and stored on the electronic device. The personality file can be then transferred to another electronic device for archival purposes. Thereafter, should the personality information be lost due to device failure, embodiments of the present invention provide for restoring the electronic device back to its original operating state by importing the personality information back into the electronic device.

27 Claims, 14 Drawing Sheets

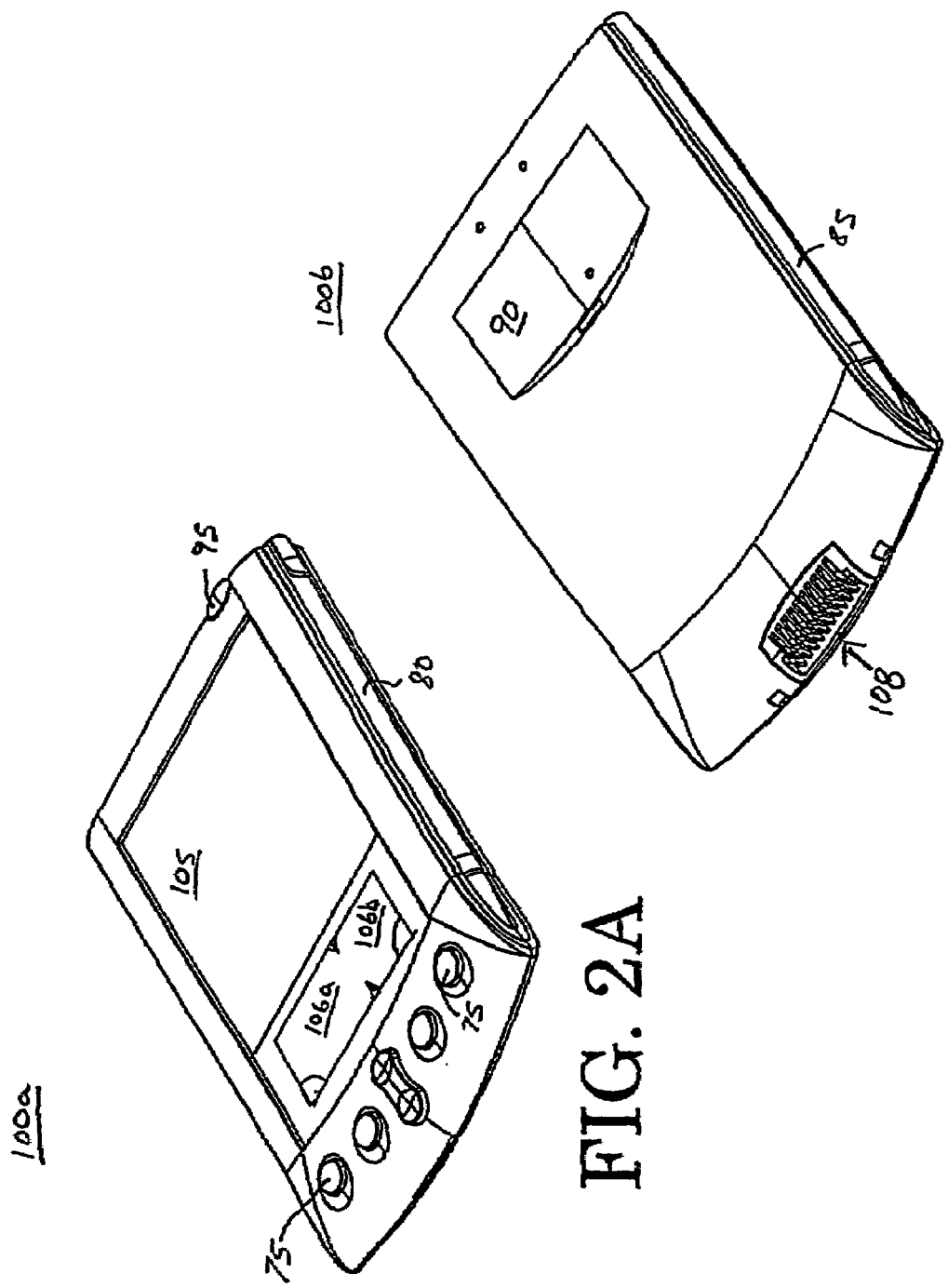

500

I. Radio calibration parameters —— 510
    calDcToFreqIn
    calDcToFreqOut
    calFreqToAgingIn
    calFreqToAgingOut
    calAgingToModOut
    calAgingToGainOut
    calDcOffset
    calDcOffsetDelta
    calTemperature
    calAgingWord
    calVCOGain
    calTransmitGain
    calFOffset
    powLevels
    powLevelCurrents
    rssiM
    rssiB II. Signal processing parameters —— 520
    amplitudeThreshold
    crossingThreshold
    feedbackValue
    transmitOffset
    frameSyncThreshold
    receiveOffset
    correlationThreshold
    configDSPFlags
    fecSoftDelta III. Component aging state —— 530
    currentAgingWord
    currentVCOGain
    currentTransmitGain
    currentFOffset IV. Network identity —— 540
    terminalMan
    emailAddress
    hsn
    msn

810 → 60FE1C890161 010315134102
813 815
T 736E756D 000C 363046453143383930313631
T 63616C6B 0004 000000BE7
T 636E6364 0004 00001C20
T 6D627478 0060 0E000000F100FC18000003E8EEB8006412E0006200850AE54
820 ED5FBC6CBA0026002300001DFF0005CD0012008400235F6CFFE96D615851411340406
036E02F8029E01DC01480BB8000103E800000000EF50000E2000000001FF002600000000
000B0A970F
P 7264696F 0002 0008 008700023605C0159
P 7264696F 0003 0012 0000000200000002F00F9BD6100018AA0B433
P 696E6574 4950 0004 0A01B6A5
P 53454355 504B 0040 4B657932000000009002A0000011CBCFEA2F539B405424
830 E7772B54AED75BC921B6607780555075FFC6D0CF2A0B372B4D36067CD87ECDB69000
00000000000000
P 696E6574 554E 0011 6A6C6F75636B7340706163E6D2E6E657400
P 696E6574 6974 0001 02
P 696E6574 0000 0004 0A01B6A5

FIG. 8

METHOD AND APPARATUS FOR AUTOMATED PERSONALITY TRANSFER FOR A WIRELESS ENABLED HANDHELD DEVICE

BACKGROUND OF THE INVENTION

1. Field of the Invention

The present invention relates to the field of restoring electronic devices to an operational condition. More specifically, the present invention relates to system backup for electronic devices for later restoration due to device failure.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers with PIM software have been known as Personal Digital Assistants (hereinafter referred to as "PDAs").

In addition to PIM application features, some PDAs also include internal radio devices allowing connection to wireless communication networks. Enabling a PDA with wireless capabilities provides features not normally found on a PDA, including but not limited to, wireless internet access and wireless communication (e.g., cell phone communication).

Operation of the radio device within a PDA requires extensive calibration procedures within controlled environments upon manufacturing. These calibration procedures result in defining operational parameters required for operational use of the radio device. Additionally, the operational parameters may be unique to each radio device. In a sense, each radio device has a personality that can be defined as an aggregate of data or information that is both unique to the device and critical to the proper functioning of the radio device. That is, the personality defines an operational state of the electronic device.

Some information that define a personality of a device include device serial numbers, radio calibration parameters, performance history, and wireless network identities. For example, the radio calibration parameters allow the specific radio device to operate within a standard spectrum of operating frequencies. Each radio device operates using a radio crystal that provides a frequency component depending on the dimensional characteristics of the crystal. The frequency component may or may not fall within the standard spectrum of operating frequencies. However, calibrating the various radio parameters (e.g., baseline and gain parameters) alters the frequency component to allow the radio to operate within the standard operating frequencies.

Furthermore, the radio crystal experiences a degradation in its frequency component over time due to crystal relaxation. This relaxation shifts the frequency component of the radio crystal causing the radio device to change its operating frequency. As a result, the original radio calibration parameters no longer correctly adjust the frequency component to allow the radio to operate within standard operating frequencies. Therefore, periodically each radio device undergoes a recalibration procedure that determines the degree of degradation. A performance history can be stored that allows the radio device to further adjust its frequency component for proper compliance with the standard operating frequencies.

The personality of the device is stored in memory, typically a non-volatile read only memory (ROM). Under normal operating conditions, the personality information contained within the ROM memory cannot be rewritten, altered, or compromised. However, should the ROM memory fail, retention of the personality information contained within the ROM memory is impossible.

Many of the functions of the PDA will be retained upon replacing the ROM memory upon failure and reloading the operating system at a maintenance depot. Operating parameters used for conventional features of the PDA are homogeneous throughout a class of PDAs. Replacement of these parameters can be easily accomplished without any degradation in operating performance. However, the radio device cannot operate properly without incorporating the unique information that defines its operational state or personality. Since this information is lost and not readily obtained, the radio features of the PDA are rendered inoperable.

One solution would be to recalibrate the radio device contained within the PDA. This could be accomplished by either providing calibration machinery to the maintenance depot or sending the repaired PDAs to the manufacturing plant for re-calibration.

However, cost issues preclude recalibrating the repaired PDAs. First, it is cost prohibitive to provide expensive calibration equipment to the maintenance depot. Second, the cost of recalibrating the radio device at the manufacturing plant exceeds any profit from or cost of the original equipment. In other words, repair costs in calibrating the radio device could approach replacement costs making it more economical to the user to simply replace the damaged PDA with an updated PDA. Third, since a repaired PDA has left the clean environment of the manufacturing plant, the repaired PDA will contaminate the controlled environment used for calibrating radio device, ultimately precluding any recalibration of the failed radio device.

Another method that was previously employed in test environments required manual back ups of the information that define a personality of the device. Should the device fail, a common occurrence and objective in testing environments, the personality of the radio device could manually be re-entered into the device. However, this procedure is time consuming and extremely error prone due to human involvement.

A procedure implemented for manually backing up a radio device could take more than three hours to complete. Not only is this time intensive, but human error is inevitable in reading the personality information, manually writing down the information, and then manually inputting the personality information back into the PDA.

Thus, previous methods and systems could not easily or economically restore operational parameters necessary for using a radio device contained within a handheld computer that has been repaired.

SUMMARY OF THE INVENTION

Embodiments of the present invention disclose a method and system for automated personality transfer for a wireless-enabled handheld device. One embodiment of the present invention provides for easily restoring operational parameters necessary for using a radio device contained within a handheld device. Another embodiment of the present invention provides the above need and further provides economical restoration and recycling of wireless capabilities contained within damaged handheld devices. Still another embodiment provides the above accomplishment and further provides for easy archiving of the operational parameters.

These and other objects and advantages of the present invention will no doubt become obvious to those of ordinary skill in the art after having read the following detailed description of the preferred embodiments which are illustrated in the various drawing figures.

Specifically, embodiments of the present invention disclose a method and system for automated personality transfer in a wireless enabled handheld device. In one embodiment, the present invention automatically extracts personality information that is unique and critical to the proper functionality of an electronic device. The information includes critical operating parameters necessary for configuring the handheld device for wireless capabilities.

A personality file containing the personality information is created and stored on the electronic device. The personality file can be then transferred to another electronic device for archival purposes. An exporting feature of a personality application accomplishes the creation of the personality file.

Thereafter, should the personality information be lost due to device failure, embodiments of the present invention provide for restoring the handheld device back to its original operating state by importing the personality information back into the handheld device. Restoration of failed devices to their original operating state is accomplished by an importing feature of the personality application.

To import the necessary personality information or operating parameters that allow an electronic device return to its original operating state, one embodiment of the present invention automatically searches for all files containing personality information that are stored in the handheld device. These files are of a particular format, such that the personality application searches by looking for files following the particular file format. After device failure, the particular file associated with the handheld device may have been archived, relocated, and downloaded back into the handheld device.

The import feature of the personality application lists the located files and presents them to a user. The personality application acknowledges selection of a file by the user. Data contained within the selected file is then imported into the handheld device. Thereafter, the handheld device is restored to its original state and ready for operation.

BRIEF DESCRIPTION OF THE DRAWINGS

FIG. 2A is a top side perspective view of a handheld electronic device that can be used as a platform for embodiments of the present invention.

FIG. 2B is a bottom side perspective view of the handheld electronic device of FIG. 2A, in accordance with one embodiment of the present invention.

FIG. 5 is a table listing exemplary personality information that are unique to a handheld electronic device, in accordance with one embodiment of the present invention.

FIG. 8 illustrates exemplary contents of a personality file that contain personality information pertinent to operating a handheld electronic device, in accordance with one embodiment of the present invention.

DETAILED DESCRIPTION OF THE INVENTION

Figure 1A:
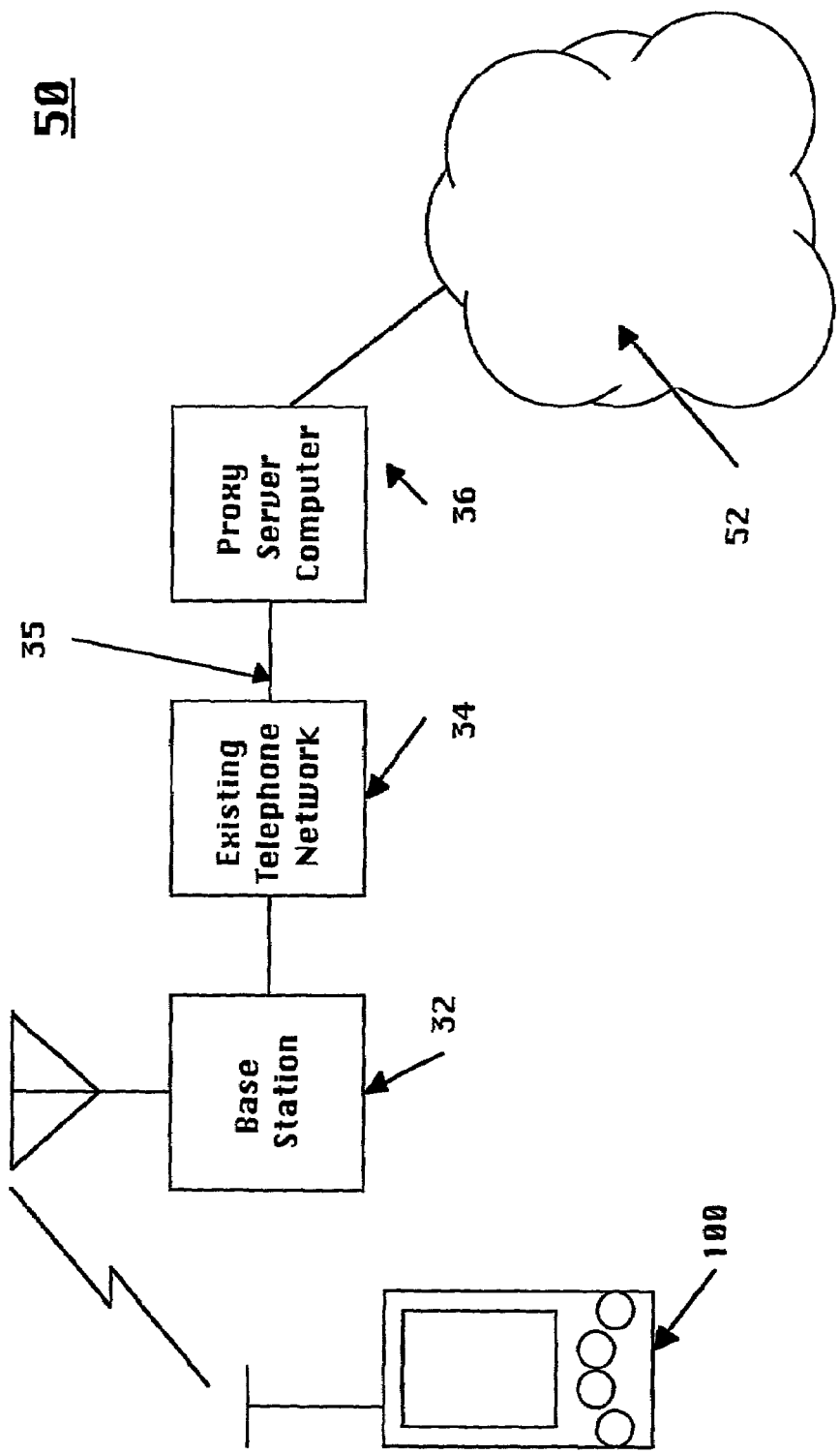
FIG. 1A illustrates a block diagram of a first exemplary network environment including a handheld electronic device in accordance with an embodiment of the present invention.

Reference will now be made in detail to the preferred embodiments of the present invention, an automated personality transfer for a wireless enabled handheld electronic device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "processing," "computing," "translating," "calculating," "determining," "scrolling," "displaying," "recognizing," or the like, refer to the action and processes of a computer system, or similar electronic computing device. These actions and processes manipulate and transform data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device requiring restoration of operational parameters necessary for operating the electronic device. One of the common types of electronic systems which can be used in accordance with one embodiment of the present invention is referred to as a personal digital assistant (PDA), or commonly called a portable computer system, which may be a PDA. Reference to these electronic systems as handheld electronic devices or handheld device is also made in this specification. The PDA is a pocket sized electronic organizer with the capability to store telephone numbers, addresses, daily appointment, and software that keeps track of business or personal data such as expenses, etc.

Furthermore, the PDA also has the ability to connect to a personal computer, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary personal digital assistant. The PDA 100 is also known as a palmtop or palm-sized electronic system or computer system, or handheld electronic device. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the PDA 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the PDA 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
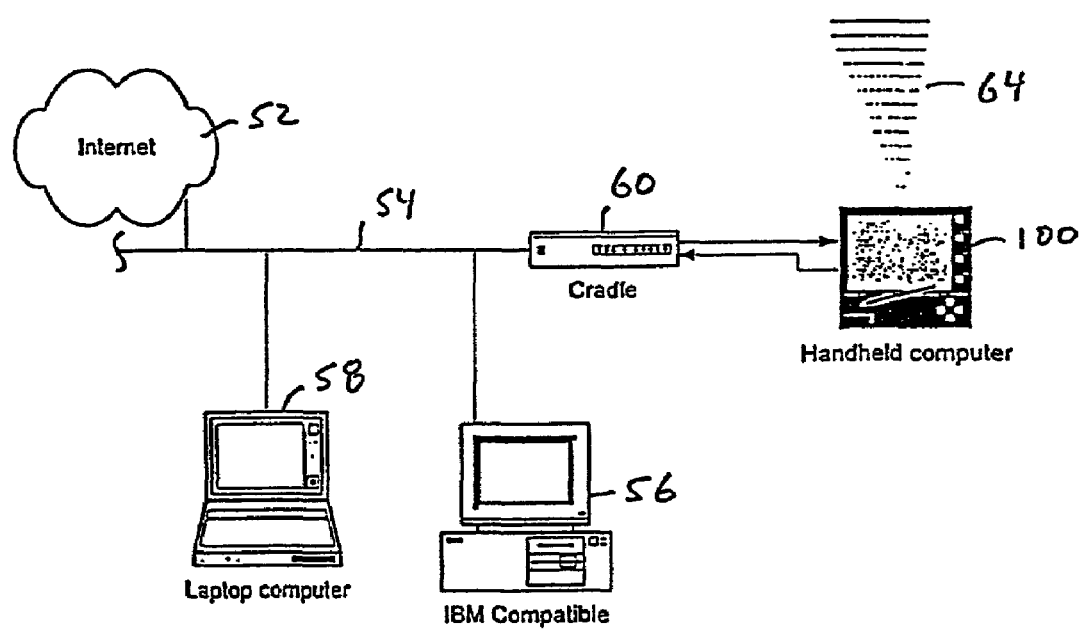
FIG. 1B illustrates a block diagram of a second exemplary network environment including a handheld electronic device coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a PDA 100 in one embodiment of the present invention. Cradle 60 provides an electrical and mechanical communication interface between bus 54 (and anything coupled to bus 54) and the computer system 100 for two way communications. The PDA 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

FIG. 2A is a perspective illustration of the top face 100*a* of one embodiment of the palmtop computer system. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
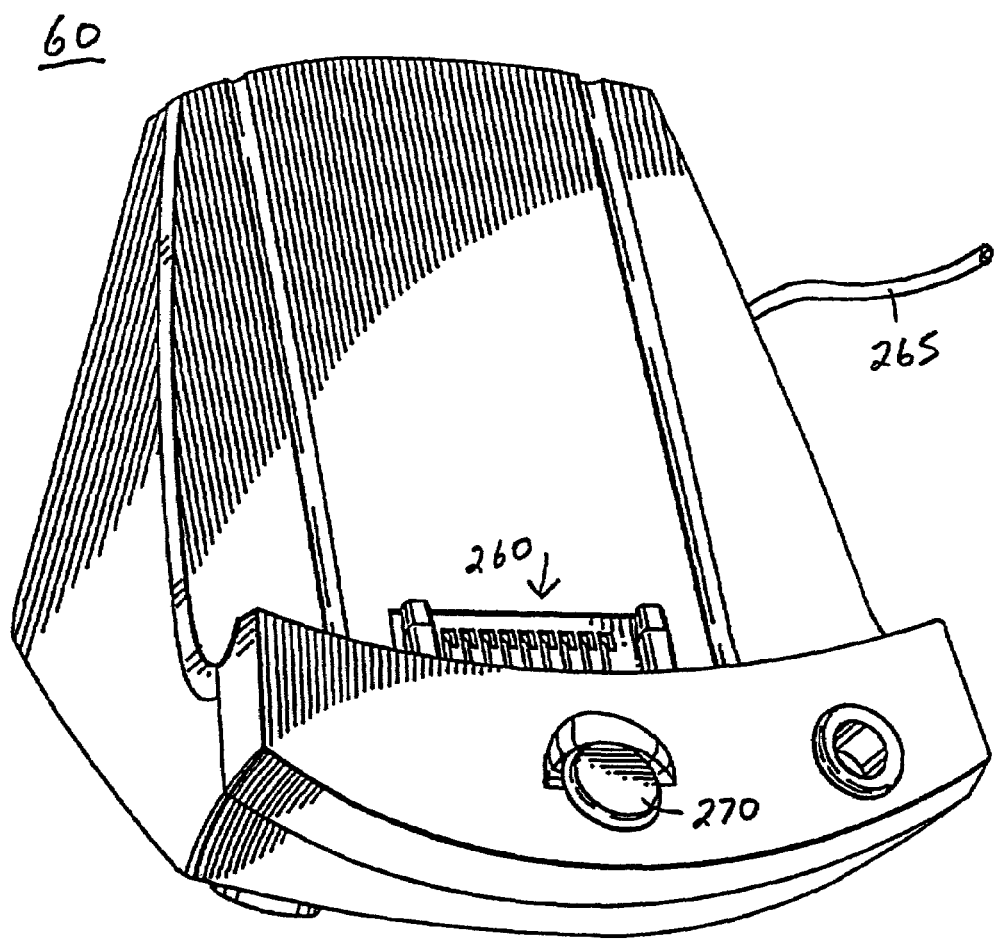
FIG. 3 is a perspective view of the cradle device for connecting the handheld electronic device to other systems via a communication interface, in accordance with one embodiment of the present invention.

FIG. 3 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 4:
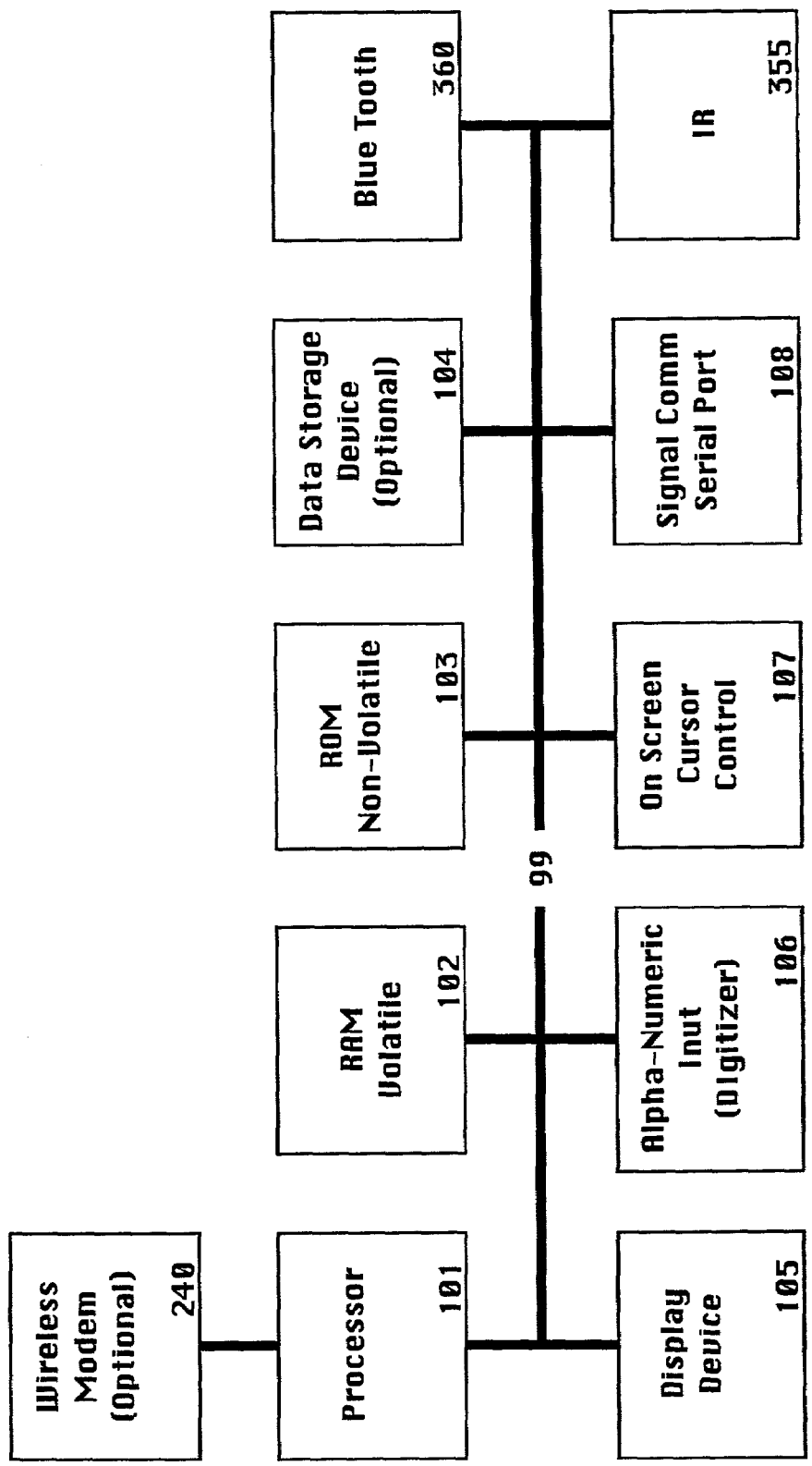
FIG. 4 is a logical block diagram of the handheld electronic device, in accordance with an embodiment of the present invention.

Referring now to FIG. 4, portions of the present electronic system are comprised of computer-readable and computer-executable instructions which reside, for example, in computer-readable media of an electronic system (e.g., personal digital assistant, computer system, and the like). Although the functional faceplate of the present invention can be implemented in a variety of different electronic systems such as a pager, a cell phone, a remote control device, etc., one exemplary embodiment includes the integration of the faceplate with a portable electronic device or PDA, such as PDA 100. FIG. 4 is a block diagram of exemplary interior components of an exemplary PDA 100 upon which embodiments of the present invention may be implemented.

FIG. 4 also illustrates circuitry of an exemplary portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

Computer system 100 also includes an optional data storage device 104 (e.g., thin profile removable memory) coupled with the bus 99 for storing information and instructions. Device 104 can be removable. Device 104 may also be an SDROM card reader or equivalent removable memory reader.

Also included in computer system 100 of FIG. 4 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 for later analysis.

System 100 of FIG. 4 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer of 106 or 107 can be implemented using well known devices.

System 100 also contains a flat panel display device 105 coupled to the bus 99 for displaying information to the computer user. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with a cradle. In one embodiment, the serial communication interface 108 is a serial communication port, but could also alternatively be of any of a number of well known communication standards and protocols, e.g., parallel, SCSI, Firewire (IEEE 1394), Ethernet, etc. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet, e.g., via a proxy server. In other embodiments, TCP protocol can be used or SMS can be used. System 100 of FIG. 4 may also contain batteries for providing electrical power.

Personality Information

A method and system are described for a handheld electronic device with wireless capabilities. A device personality consists of an aggregate of information that is both unique to the handheld electronic device and is critical to the proper functioning of the handheld device. This is especially true to enable the wireless functionality of the handheld device.

Personality information include operational parameters required for the operational use of the radio device contained within the handheld device. These operational parameters define an operational state of the handheld device and is typically discovered through extensive calibration procedures conducted within controlled environments. Furthermore, the personality information is unique to a particular handheld electronic device. If personality information from a first device were to be inserted and substituted into a second handheld electronic device, the second handheld device could continue to operate its PIM and related application not associated with its wireless capabilities. However, the wireless capabilities of the second handheld device would be rendered inoperable.

FIG. 5 illustrates a table 500 that includes, but is not limited to, personality information that are necessary to operate the wireless capabilities of a handheld device. Some information that define a personality of a device include device serial numbers and radio calibration parameters 510. The radio calibration parameters 510 adjust the frequency component of a specific radio device to operate within a standard spectrum of operating frequencies. These parameters 510, among others, help define an operational state of the handheld device, specifically the radio device contained within the handheld device.

Table 500 of FIG. 5 also illustrates performance history values that help a radio device maintain its operational state. Signal processing parameters 520 and component aging state parameters 530 are recalibrated and checked periodically to adjust for degradation of the frequency component of the radio device. The performance history parameters 520 and 530 allows the radio device to further adjust its frequency component in order to maintain compliance with the standard operating frequencies. Table 500 also illustrates network identity parameters 540 that uniquely identify a handheld device with its communication network.

Importing and Exporting Personality Information Automatically for a Wireless Enabled Handheld Electronic Device Although the description of the present invention will focus on an exemplary personal digital assistant (hereinafter referred to as "PDA") or palmtop computer system, the present invention can be practiced with other electronic systems or electronic devices (e.g. personal computer systems, cellular phones, pagers, portable web devices, etc.).

Figure 6:
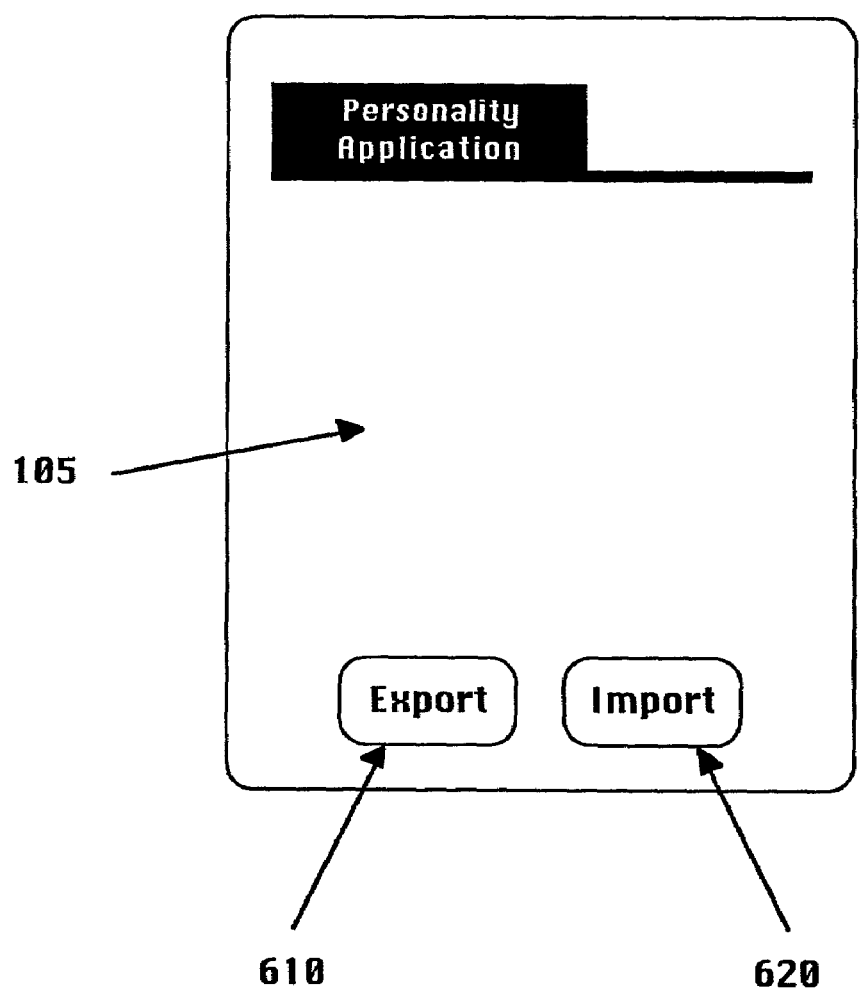
FIG. 6 is a front view of a handheld electronic device illustrating the display screen, and a generalized form of a personality application showing the importing and exporting features, in accordance with one embodiment of the present invention.

FIG. 6 is a front view of an electronic device (e.g., PDA 100) illustrating a screen shot 600 on the display screen 105, in accordance with one embodiment of the present invention. Screen shot 600 shows a personality application providing two options for selection by a user. This exemplary screen is presented upon launching the personality application on the electronic device. The personality application can both export and import personality information unique to the electronic device. A button 610 selects the export option where personality information located on the electronic device is located and stored into a file on the device. A button 620 selects the import option where personality information located on a file is imported into the electronic device.

In one embodiment, the personality application, once downloaded to a wireless enabled (RF enabled) PDA will read the personality of the PDA, including radio configuration data (e.g., tuning parameters, calibration parameters, and anything else that differs from device to device). Thereafter, the flash memory containing the personality data can be replaced without loss of any functionality of the PDA, including its wireless capabilities, if these personality information were archived to a separate location. Replacement may be necessary due to a failed flash memory or because of upgrading. The personality application can then import or write back to the new flash memory the archived personality information allowing the radio in the PDA to operation with the same parameters as previously stored. The personality application facilitates returning a wireless enabled PDA to an operational state without needing expensive and time consuming re-calibration that is often only available on the original factory floor.

Figure 7:
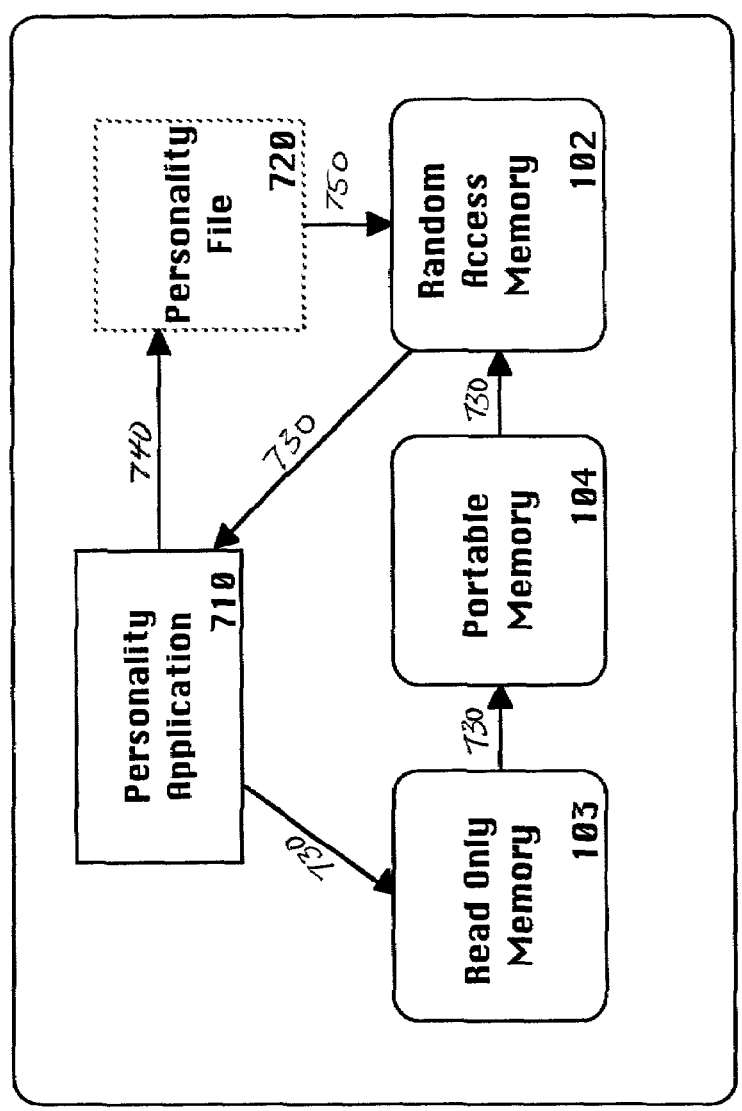
FIG. 7 illustrates a data-flow diagram illustrating the flow of information for the computer applications used to export personality information, in accordance with one embodiment of the present invention.

FIG. 7 illustrates an exemplary data flow diagram for exporting personality information into a file on a electronic device, such as PDA 100, in accordance with one embodiment of the present invention. In FIG. 7, after a user selects the export functionality of the personality application 710, the application 710 automatically searches and locates personality information that is critical to the proper functioning of the electronic device 100. This personality could include, but is not limited to, information such as those listed in Table 500 of FIG. 5.

In FIG. 7, the personality application automatically searches through each of the memory storage areas contained within the electronic device 100. For purposes of illustration, FIG. 7 shows one exemplary data flow path 730 to each of the memory devices. In FIG. 7, the flow path 730 for the personality application 710 goes from the ROM memory 103 to the portable memory 104, and to the RAM memory 102, before the personality application processes the data. However, it is appreciated that embodiments of the present invention will search in any memory storage area for personality information, and that the personality application can search in any order through the memory storage areas.

It is appreciated that the personality application 710 can search, locate and fetch personality information in locked and unlocked areas of ROM memory 103. For example, the serial number of the electronic device is stored in a specific location of locked flash ROM memory 103. The personality information is capable of reading information stored in the locked flash memory, in one embodiment of the present invention.

In another embodiment, the personality application 710 searches specific areas of ROM memory (e.g., memory addresses) that contain specific items of personality information. Since all the personality information could be located in specific locations of memory, the personality application need only search in pre-determined locations to accumulate the personality information specific to the electronic device. In another embodiment, the personality application searches for information following a specific format, such as, a marker that indicates the information is personality information.

The personality application 710 fetches any personality information contained within the electronic device 100 and stores the information as shown by data flow path 740. The personality information is stored in a personality file 720 that is also automatically created by the personality application 710. In one embodiment, the personality information is stored after searching completely through one of the memory storage areas before searching through the other memory storage areas.

Thereafter, data flow path 750 shows that the personality file 720 is stored on the electronic device 100. In one embodiment, the personality file 720 is stored in RAM memory 102 of electronic device 100. The personality file could be further backed up through synchronizing, beaming, or transferring through any other means to another electronic device.

FIG. 8 illustrates an exemplary personality file 720 that contains personality information pertinent to operating a handheld electronic device, in accordance with one embodiment of the present invention. The personality file 720 is generated after a user of the electronic device 100 has executed the export feature of the personality application, as shown in FIG. 6. The personality file 720 follows a specific format: a title, "T" records, and "P" records. The "T" and "P" records define the location of memory (e.g., the memory address) the information contained within the "T" and "P" record should be imported to in electronic device 100.

For example, the title of all personality files consists of two parts. Title 810 of file 720 shows part 813 that contains a twelve character device serial number. Title 810 also consists of part 815 that contains a date and time stamp in the following format, "YYMMDDhhmmss." Parts 813 and 815 are separated by a space in the title 810.

File 720 of FIG. 8 also contains multiple "T" records, such as "T" record 820. The "T" records correspond to hardware tokens on electronic device 100. The format of the "T" record consists of the letter "T", followed by a space, followed by an eight ASCII hex character token name, followed by a space, followed by a four ASCII hex character data length, followed by a space, followed by the data bytes in ASCII hex.

File 720 of FIG. 8 also contains multiple "P" records, such as "P" record 830. The "P" records correspond to non-volatile preferences on the electronic device 100. Information contained within the "P" records could be the most recent aging records obtained by the device during one of its recalibration procedures to check the deterioration of the operating parameters. The format of the "P" record consists of the letter "P", followed by a space, followed by an eight ASCII hex character preference name, followed by a space, followed by a four ASCII hex character preference index, followed by a space, followed by a four ASCII hex character data length, followed by a space, followed by the data bytes in ASCII hex.

It is appreciated that the file format of the personality file 720 is exemplary only and that embodiments of the present invention could use other formats containing the same or similar personality information.

Figure 9A:
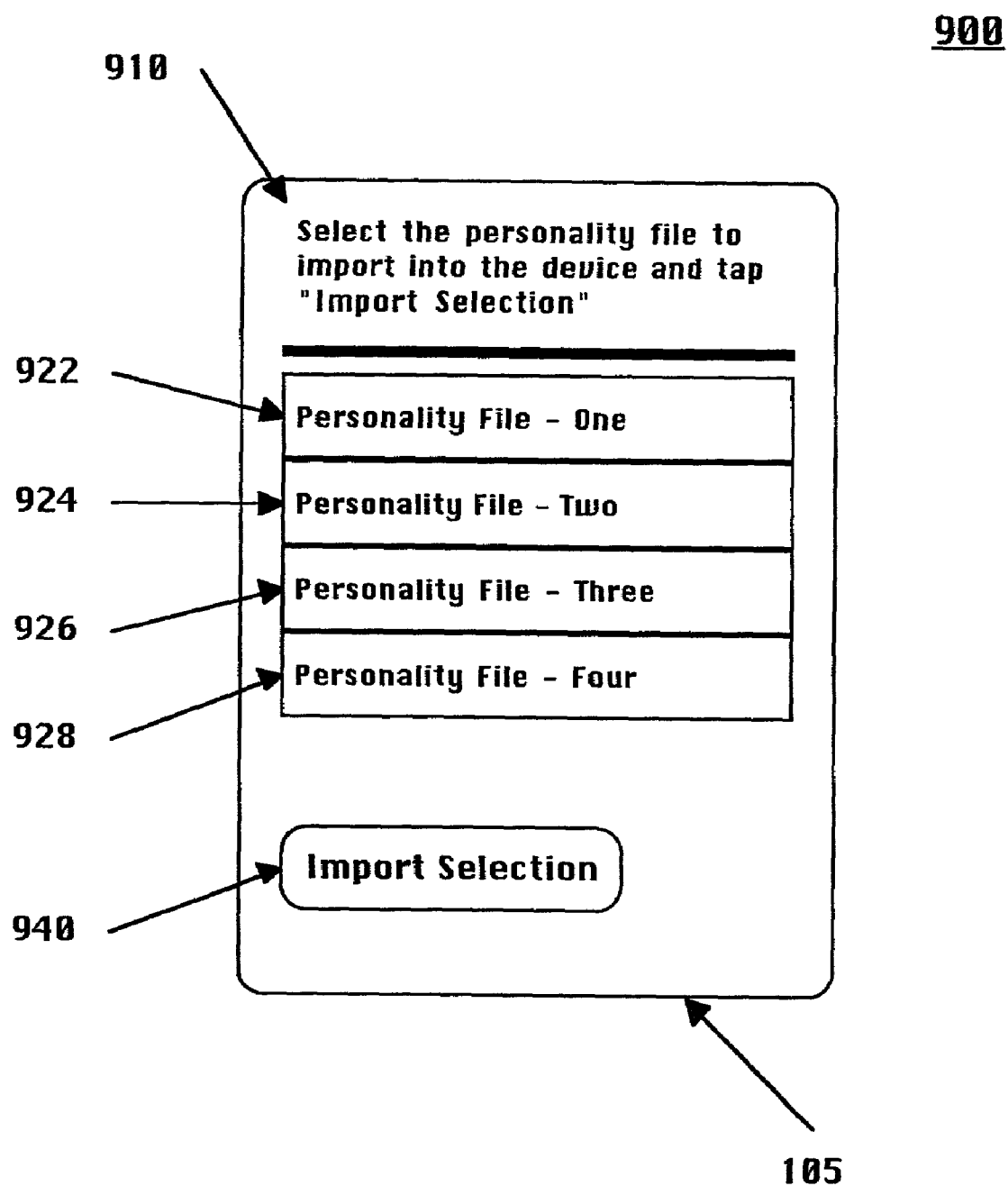
FIG. 9A illustrates a front view of a handheld electronic device illustrating the display screen, and a generalized form of a personality application showing a list of possible personality files suitable for importing into the handheld electronic device, in accordance with one embodiment of the present invention.

FIG. 9A illustrates a front view of an electronic device, such as PDA 100, illustrating the display screen 105, and a generalized form of a personality application showing a screen shot 900 that provides a list of possible personality files suitable for importing into the electronic device 100, in accordance with one embodiment of the present invention. The screen shot 900 is displayed after a user of the electronic device 100 has executed the import feature of the personality application 710.

Screen shot 900 shows an instruction bar 910 that instructs the user to select one of the displayed personality files for importing into the electronic device 100. After selection, the user taps the "Import Selection" button 940 to start the import process.

The personality application, upon execution of the import feature searches and locates all the personality files contained within the electronic device 100. As shown in FIG. 8, the personality files follow a specific file format. The personality application searches for titles that follow the format illustrated by title 810 of FIG. 8, namely serial number followed by a time stamp (e.g., parts 813 and 815 of title 810), in accordance with one embodiment of the present invention.

Screen shot 900 illustrates four files found on the electronic device that may contain the operational parameters pertaining the specific electronic device 100. Files 922, 924, 926, and 928 all contain personality information that pertain to electronic devices that may or may not be the specific electronic device 100 that is running the import feature of the personality application 710.

Figure 9B:
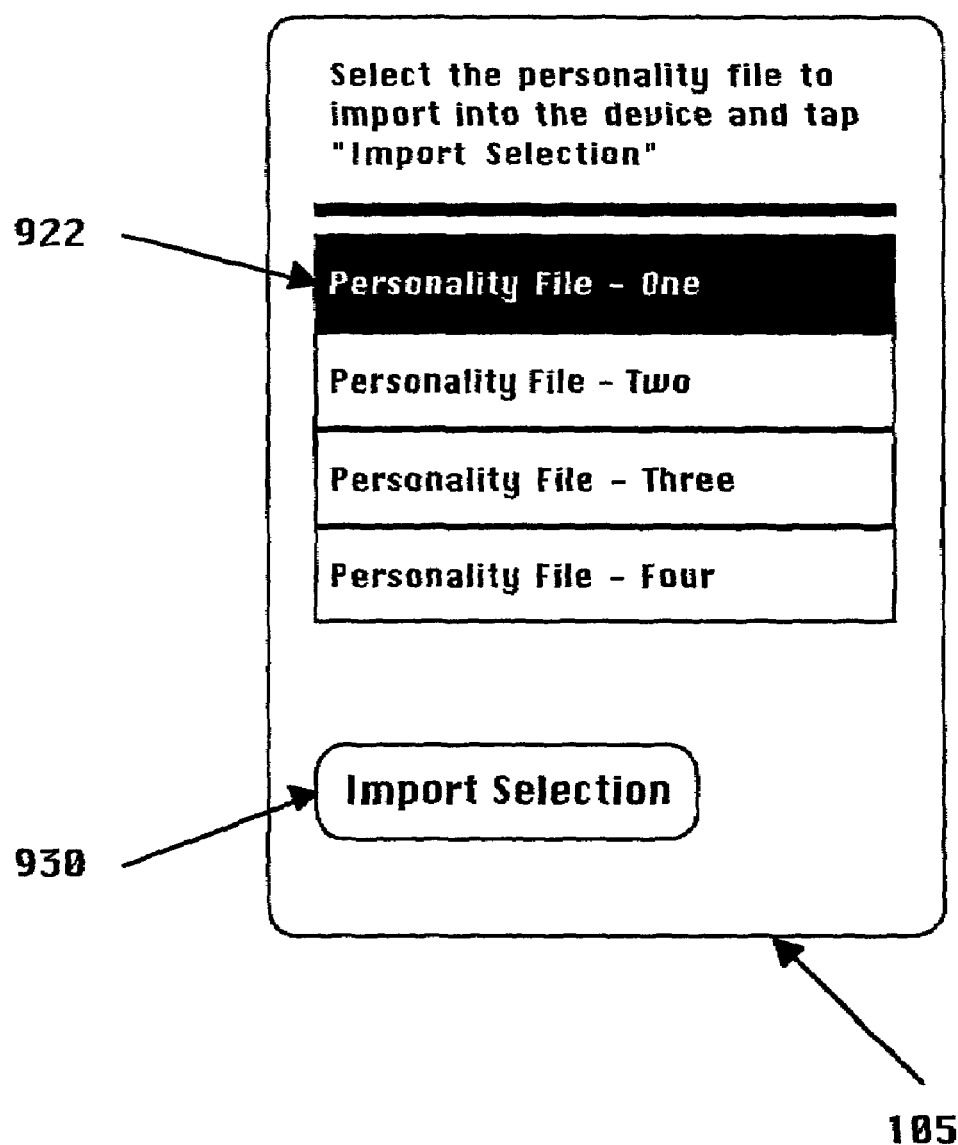
FIG. 9B illustrates a front view of a handheld electronic device illustrating the display screen, and a generalized form of a personality application showing the selection of one personality file for importing into the handheld electronic device, in accordance with one embodiment of the present invention.

FIG. 9B illustrates a front view of a handheld electronic device illustrating the display screen 105, and a generalized form of a personality application showing the selection of one personality file 922 for importing into the handheld electronic device 100, in accordance with one embodiment of the present invention. Since the titles of the personality files 922, 924, 926, and 928 all include a serial number from the electronic device from which the personality information was exported, a user need only cross check the actual serial number of the handheld device 100 running the import operation of the personality application with each of the available personality files as displayed in FIGS. 9A and 9B. Typically, the serial number is conveniently located on the back of the electronic device 100. Additionally, the most recent personality file could be chosen if there are multiple personality files pertaining to the electronic device 100.

FIG. 9B shows that personality file 922 was selected by the user. The list entry showing personality file-one 922 is displayed in reverse-video to indicate selection, in accordance with one embodiment of the present invention. This information or data contained within personality file 922 will be automatically imported into the electronic device by the personality application, in accordance with one embodiment of the present invention.

Figure 10:
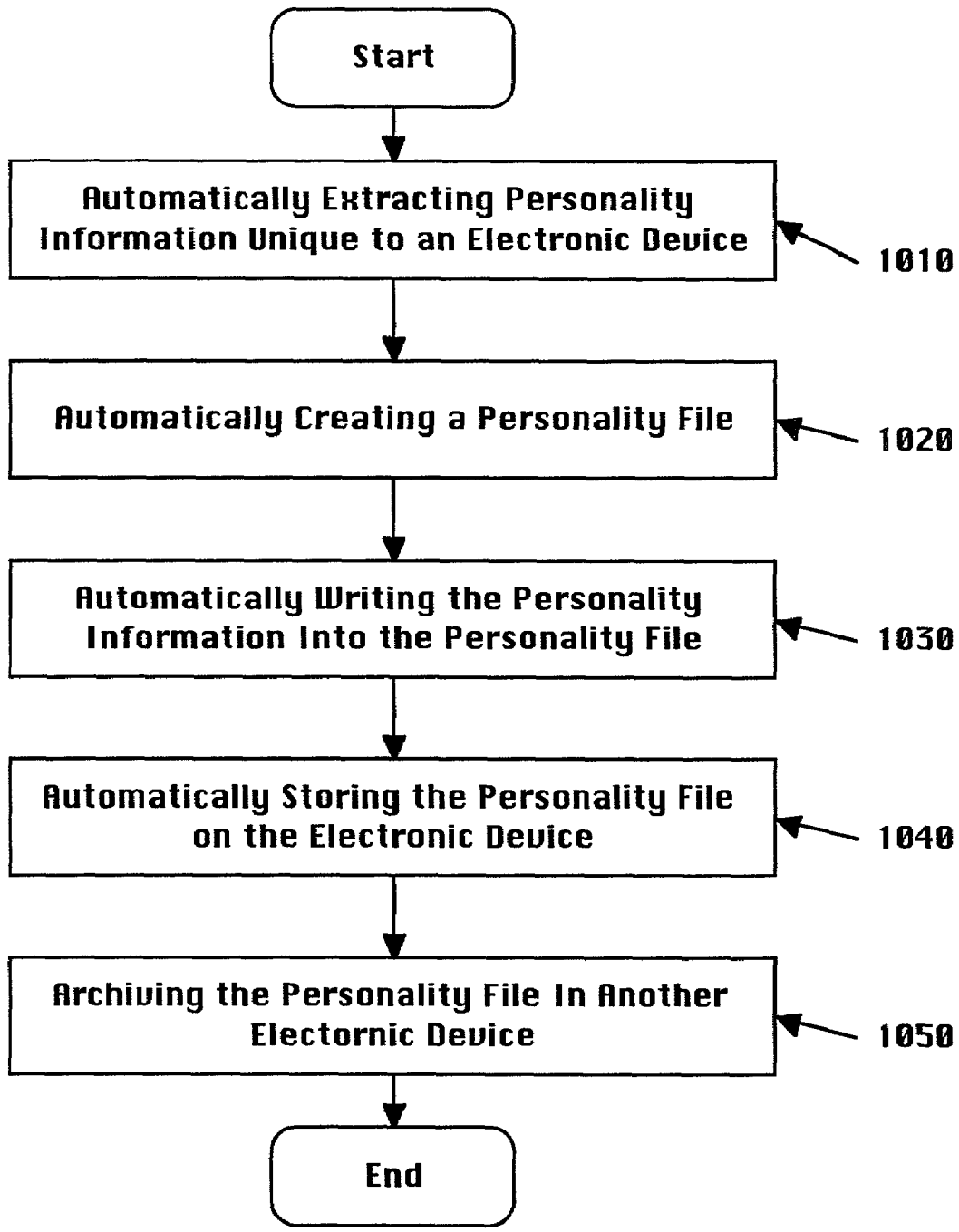
FIG. 10 is a flow diagram illustrating steps in a computer implemented method for exporting personality information for a handheld electronic device, in accordance with one embodiment of the present invention.

FIG. 10 is a flow chart 1000 illustrating steps in a computer implemented method for exporting personality information for a handheld electronic device, in accordance with one embodiment of the present invention. As shown in step 1010, the present embodiment automatically extracts personality information that is unique to the electronic device. This personality information is critical to the proper functioning of the electronic device, including the wireless capabilities of the electronic device.

In one embodiment, the personality information contains state information such as radio calibration parameters that enable the electronic device to adjust a frequency component in order to allow the electronic device to communicate over a wireless network.

As shown in step 1020, the present embodiment then creates a personality file. In one embodiment, the file is a memo file created by a memo application on the operating system of the electronic device.

As shown in step 1030, the present embodiment then automatically writes the personality information located and extracted in step 1010 into the personality file. In step 1040, the present embodiment then automatically stores the personality file on the electronic device.

As shown in step 1050, another embodiment of the present invention transfers the personality file to another electronic device for purposes of archiving. Should the memory fail containing the personality information, the personality information could be easily restored to the appropriate locations in memory by importing data contained within the archived personality file.

In another embodiment of the present invention, it is envisioned that all newly manufactured handheld electronic device undergo an exporting of their personality information using the method illustrated in embodiments of the present invention. A central archive or repository could store the personality files of each of the handheld electronic devices. Therefore, upon repairing the failed memory of the handheld electronic device, the erased personality information could be easily located in the archive and restored on the handheld electronic device. Thus, a normally inoperable radio device contained within the electronic device could be restored to its original operating state.

Figure 11A:
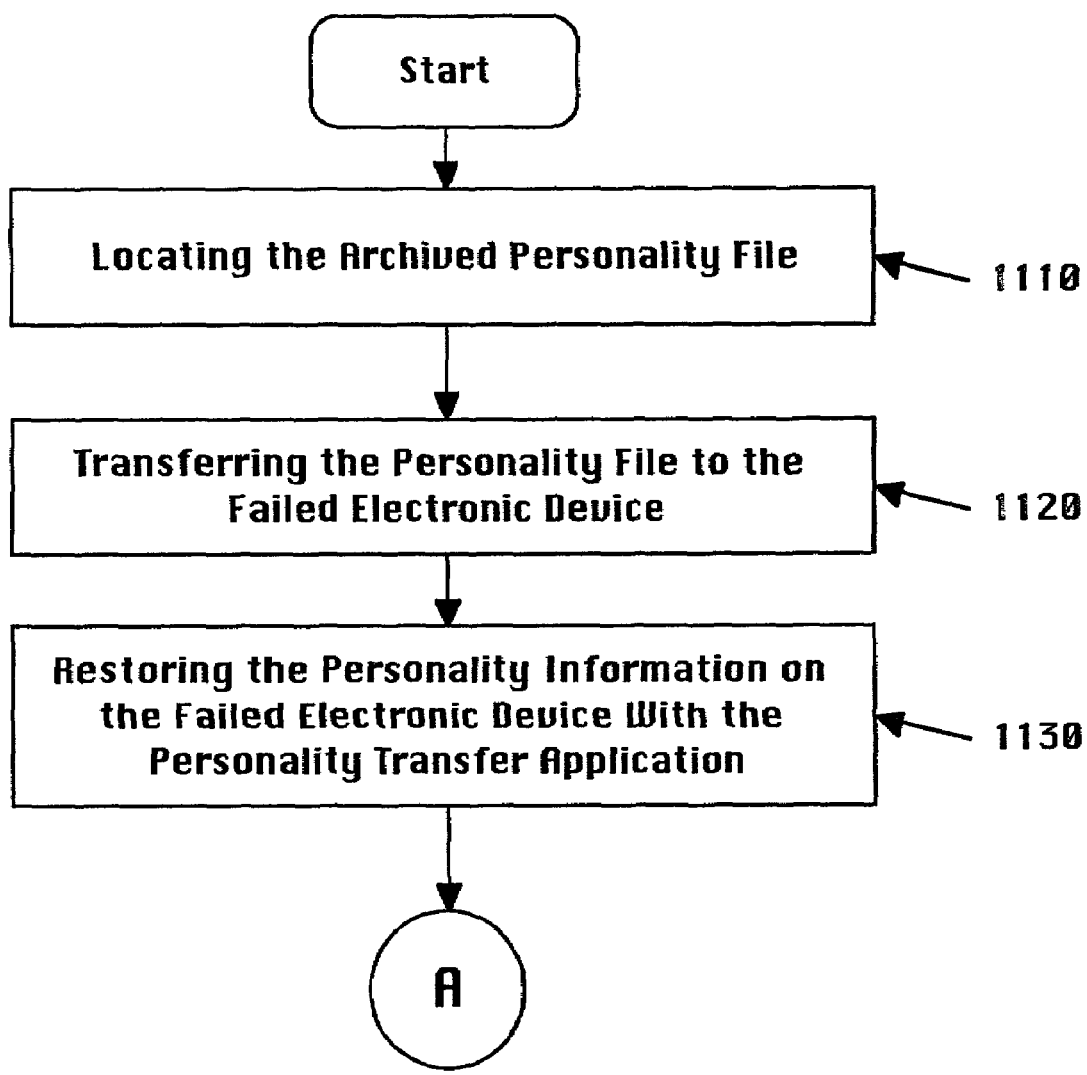
FIG. 11A is a flow diagram illustrating steps in a computer implemented method for archiving personality information for a handheld electronic device, in accordance with one embodiment of the present invention.

FIG. 11A is a flow diagram illustrating steps in a computer implemented method for archiving personality information for a handheld electronic device and restoring the information on a repaired electronic device, in accordance with one embodiment of the present invention.

As shown in step 1110 of FIG. 11A, the present embodiment assumes that an archived personality file for the electronic device exists. Should the electronic device fail, specifically the internal memory that contains the personality information for the electronic device to provide wireless functionality, then the personality information could be easily and economically restored. In step 1110, the present embodiment locates the archived personality file. This file could be in a personal computer or on a central server computer accessible through numerous portholes, including the internet.

As shown in step 1120 of FIG. 11A, the personality file specific to the failed electronic device is transferred to the device. This could be done by copying the file, beaming the file, or any other suitable transferring process.

As shown in step 1130 of flow chart 1100, the present embodiment then restores the personality information using the personality transfer application. Flow chart 100 continues at point A in flow chart 1150 of FIG. 11B

Since some items of personality information may be stored in an area of locked ROM memory (e.g., locked flash memory), those areas of locked flash memory must be first unlocked. For example, the serial number of an electronic device is stored in locked flash memory so that a copying device cannot easily mimic another device by simply changing its serial number in the locked flash area. This is one measure to prevent unauthorized use of the copied device's wireless airtime over the wireless communication network.

Figure 11B:
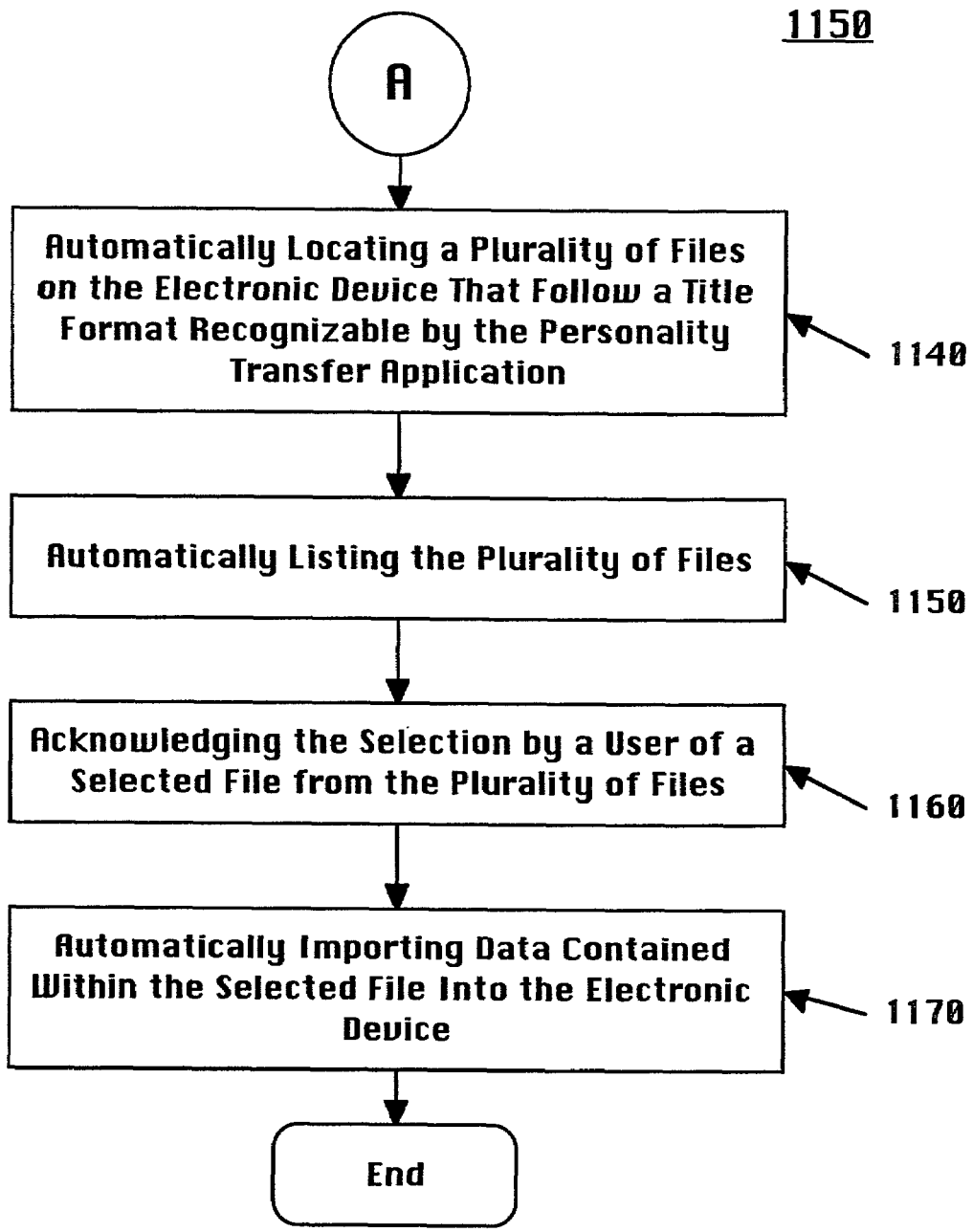
FIG. 11B is a flow diagram illustrating steps in a computer implemented method for importing personality information for a particular handheld electronic device, in accordance with one embodiment of the present invention.

FIG. 11B is a flow diagram illustrating steps in a computer implemented method for importing personality information for a particular handheld electronic device, in accordance with one embodiment of the present invention. The importing of the personality information is for the purpose of restoring the operational state of the electronic device to enable its wireless capabilities. Continuing from point A in FIG. 11A, the present embodiment automatically locates a plurality of files that are stored in the electronic device in step 1140. The plurality of files includes the personality file created in steps 1020 and 1030, and transferred back to the electronic device in step 1120 of flow chart 1100.

As shown in step 1150 of FIG. 1150, the present embodiment then lists all the files on a display of the electronic device. Some of the plurality of files may not pertain to the electronic device, but do contain personality information pertinent to other electronic devices. Numerous files may contain personality information pertinent to the electronic device, but some may be more current or accurate than others. Selection of the one file suitable for importing into the electronic device is done by a user of the personality application implementing the restoration of the electronic device.

As shown in step 1160 of flow chart 1150, the present embodiment acknowledges the selection of one of the plurality of personality files. In step 1170, the present embodiment then automatically imports the data contained within the selected personality file to the electronic device. In one embodiment, specific items of data contained within the personality file correspond to pre-determined ROM memory locations. This memory location is provided with each item of personality information. As such, the importing feature of the personality application imports each of those items into their corresponding predetermined locations.

Restoring the personality of an electronic device also restores the wireless capabilities of the device, in one embodiment of the present invention. Rather than simply foregoing the wireless capability of a device, or worse, discarding the entire device, the failed device could easily and economically be returned to its original operating state using the method as described in embodiments of the present invention.

While the methods of embodiments illustrated in flow charts 10, 11A, and 11B show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of flow charts 10, 11A, and 11B may be implemented utilizing processor 101 and ROM memory 103 and RAM memory 102, as shown in FIG. 4. Furthermore, other types of memory storage can be utilized to accomplish the aforementioned such as a hard drive, a CD ROM, flash memory, or any compact integrated circuit memory storage device.

The preferred embodiment of the present invention, a method and system for importing and exporting directory and calendar information to and from personal information management computer applications, is thus described. While the present invention has been described in particular embodiments, it should be appreciated that the present invention should not be construed as limited by such embodiments, but rather construed according to the below claims.

The invention claimed is:

1. In an electronic device, a method of restoration comprising the steps of:
   a) extracting from read only memory (ROM) of said electronic device for restoring purposes radio calibration parameter information unique to said electronic device, wherein said radio calibration parameter information comprises critical operating parameters for adjusting the frequency of wireless communication of said electronic device;
   b) creating a personality file;
   c) writing said radio calibration parameter information into said personality file;
   d) storing said personality file in random access memory (RAM) of said electronic device; and
   archiving said personality file by transferring said personality file to a second electronic device.

2. The method as described in claim 1, wherein said step a) further comprises the steps of:
   automatically extracting state information unique to said electronic device, said state information configuring said electronic device for wireless communication.

3. The method as described in claim 1 further comprising the steps of:

e) automatically locating a plurality of files, including said personality file, stored within said electronic device containing said information, each of said plurality of files following a format unique to said method;

f) automatically displaying a list of said plurality of files;

g) automatically acknowledging selection of one of said plurality of files, a selected file; and h) automatically importing data contained within said selected file into said electronic device.

4. The method as described in claim 3, wherein said data comprises a plurality of pre-determined operational parameters, each of which are stored in a corresponding pre-determined location within said electronic device and wherein said step h) further comprises the step of:

automatically importing each of said plurality of pre-determined operational parameters to said corresponding pre-determined locations.

5. The method as described in claim 4, wherein said corresponding predetermined locations are located in flash read only memory.

6. The method as described in claim 3, wherein said format comprises a title format including a serial number of said electronic device and a time/date stamp, wherein said step e) further comprises the step of:

automatically locating said plurality of files following said title format.

7. The method as described in claim 1, wherein said electronic device is a personal digital assistant with wireless capabilities.

8. The method as described in claim 1, wherein said personality file is a memo file associated with a memo application in an operating system of said electronic device.

9. In a personal digital assistant (PDA), a method of restoration comprising the steps of:

a) searching for a plurality of files possibly associated with said PDA, said plurality of files following a unique file format;

b) displaying a list of said plurality of files;

c) acknowledging selection of one of said plurality of files, a selected file, wherein said selected file comprises radio calibration parameter information unique to said PDA and previously extracted from said PDA and stored in said selected file for restoration purposes; and d) importing data contained within said selected file into said PDA for restoring said radio calibration parameters for adjusting the frequency of wireless communication by said PDA.

10. The method as described in claim 9, wherein each of said plurality of files comprise personality data unique to a specific PDA, at least one of which, said selected file, corresponds to said PDA.

11. The method as described in claim 10, wherein said personality data comprise critical operational parameters for configuring said PDA for wireless capabilities.

12. The method as described in claim 10, wherein said personality data comprises a plurality of pre-determined operational parameters, each of which are stored in a corresponding pre-determined location within said PDA, wherein said step d) further comprises the step of:

automatically importing each of said plurality of pre-determined operational parameters to said corresponding pre-determined locations.

13. The method as described in claim 9, wherein said step c) further comprises the step of:

acknowledging selection of said selected file by a user.

14. The method as described in claim 9 further comprising the steps of:

1i) prior to said step a), automatically extracting from read only memory (ROM) said personality data unique to said PDA;

2i) automatically creating a personality file;

3i) automatically writing said personality data into said personality file; and 4i) automatically storing said personality file in random access memory (RAM) of said PDA, said personality file also comprising said selected file; and archiving said personality file by transferring said personality file to another electronic device.

15. The method as described in claim 14 further comprising the step of:

5i) prior to said step a), transferring said personality file to a second PDA.

16. The method as described in claim 15, wherein said step 5i) further comprises the step of:

transferring said personality file via a synchronization process with said second PDA.

17. The method as described in claim 15 further comprising the steps of:

6i) prior to said step a) locating said personality file on said second PDA; and 7i) storing a copy of said personality file on said PDA.

18. The method as described in claim 9, wherein said file format comprises a title format including a serial number of said PDA and a time/date stamp, wherein said step a) further comprises:

automatically searching for said plurality of files following said title format.

19. The method as described in claim 9, wherein said electronic device is a personal digital assistant with wireless capabilities.

20. A computer system comprising:

a bus;

a processor coupled to said bus, a memory unit coupled to said bus, wherein said memory unit contains instructions that when executed implement a method of restoration comprising the steps of:

a) extracting from read only memory (ROM) of said electronic device for restoring purposes radio calibration parameter information unique to said electronic device, wherein said radio calibration parameter information comprises critical operating parameters for adjusting the frequency of wireless communication of said electronic device;

b) creating a personality file;

c) writing said radio calibration parameter information into said personality file;

d) storing said personality file in random access memory (RAM) of said electronic device; and archiving said personality file by transferring said personality file to a second electronic device.

21. The computer system as described in claim 20, wherein said step a) in said method further comprises the steps of:

automatically extracting state information unique to said electronic device, said state information configuring said electronic device for wireless communication.

22. The computer system as described in claim 20, wherein said method further comprises the steps of:

e) automatically locating a plurality of files, including said personality file, stored within said electronic device containing said information, each of said plurality of files following a format unique to said method;

f) automatically displaying a list of said plurality of files;

g) automatically acknowledging selection of one of said plurality of files, a selected file; and h) automatically importing data contained within said selected file into said electronic device.

23. The computer system as described in claim 22, wherein in said method said data comprises a plurality of pre-determined operational parameters, each of which are stored in a corresponding pre-determined location within said electronic device and wherein said step h) further comprises the step of:

automatically importing each of said plurality of pre-determined operational parameters to said corresponding pre-determined locations.

24. The computer system as described in claim 23, wherein in said method said corresponding predetermined locations are located in flash read only memory.

25. The computer system as described in claim 22, wherein in said method said format comprises a title format including a serial number of said electronic device and a time/date stamp, wherein said step e) further comprises the step of:

automatically locating said plurality of files following said title format.

26. The computer system as described in claim 20, wherein in said method said electronic device is a personal digital assistant with wireless capabilities.

27. The computer system as described in claim 20, wherein in said method said personality file is a memo file associated with a memo application in an operating system of said electronic device.

* * * * *